United States Patent [19]

Ekstrom et al.

[11] Patent Number: 5,363,427
[45] Date of Patent: Nov. 8, 1994

[54] TELEPHONE RESOURCE ALLOCATION METHOD IN A COMMUNICATION SYSTEM

[75] Inventors: Terry G. Ekstrom; Patricia A. Ekstrom, both of Algonquin; John J. Coombes, Palatine, all of Ill.

[73] Assignee: Motorola, Inc., Schaumburg, Ill.

[21] Appl. No.: 842,850

[22] Filed: Feb. 26, 1992

[51] Int. Cl.$^5$ .......................................... H04M 11/00
[52] U.S. Cl. ........................................ 379/58; 379/63
[58] Field of Search .................... 379/58, 59, 61, 63; 455/34.1, 34.2

[56] References Cited

U.S. PATENT DOCUMENTS

| | | | |
|---|---|---|---|
| 4,012,597 | 3/1977 | Lynk, Jr. et al. | 455/34.1 |
| 4,127,744 | 11/1978 | Yoshikawa et al. | 455/34.1 |
| 4,360,927 | 11/1982 | Bowen et al. | 455/34.2 |
| 4,573,206 | 2/1986 | Gravel et al. | 455/34.1 |
| 4,977,589 | 12/1990 | Johnson et al. | 379/63 |
| 5,025,254 | 6/1991 | Hess | 455/34.1 |
| 5,208,847 | 5/1993 | Allen | 379/59 |
| 5,251,249 | 10/1993 | Allen et al. | 379/59 |

FOREIGN PATENT DOCUMENTS 0103525  5/1988  Japan .................. 455/34.1

Primary Examiner—Curtis Kuntz
Assistant Examiner—Dwayne D. Bost
Attorney, Agent, or Firm—Timothy W. Markison

[57] ABSTRACT

In a communication system that provides access to telephone resources of different types, a resource allocator of the communication system may more efficiently allocate the telephone resources in the following manner. Once a communication unit of a first communication group transmits a request for allocation of a telephone resource, the resource allocator determines what communication group the requesting communication unit is affiliated with. Subsequently, the resource allocator determines whether the requesting communication unit has primary access to either a first or second set of telephone resources. When a telephone resource is available and the requesting communication unit has primary access to that telephone resource, the resource allocator allocates the telephone resource to the requesting communication unit based upon a preestablished allocation procedure.

1 Claim, 2 Drawing Sheets

TELEPHONE RESOURCE ALLOCATION METHOD IN A COMMUNICATION SYSTEM

FIELD OF THE INVENTION

This invention relates generally to communication systems and in particular to a method that allows the communication system to more efficiently allocate different types of telephone resources.

BACKGROUND OF THE INVENTION

Communication systems are known to comprise a plurality of communication units, a limited number of communication resources that are transceived via a limited number of repeaters, and a communication resource allocator that allocates the communication resources among the plurality of communication units. The communication units are typically arranged in communication groups and may be located anywhere within the communication system. Of the communication resources, which may be either TDM slot locations, a frequency carrier, a pair of frequency carriers, or any other RF transmission means, one is selected to function as a control channel.

The communication system may comprise telephone resources which the communication units may access. As is known, the telephone resources may be of different types. For example, the telephone resource may be for a secure transmission, regular telephone transmission, or a data processing transmission, etc. When a communication unit requests access to one of these resources, the communication resource allocator has to process the request based on which type of telephone resource has been selected. To process a request, the communication resource allocator must first determine what type of telephone resource was requested and then determine whether a telephone resource of that type is available. Having to perform multiple steps to allocate telephone resources reduces the communication resource allocator's efficiency. Therefore, a need exists for a method that would allow the communication resource allocator to more efficiently allocate different types of telephone resources.

SUMMARY OF THE INVENTION

These needs and others are substantially met by the telephone resource allocation method in a communication system disclosed herein. In a communication system that includes a plurality of communication units that are arranged into communication groups, a limited number of communication resources that are transceived via repeaters, a first limited number of telephone resources at least a second limited set of telephone resources and a resource allocator that allocates the communication resources and the telephone resources among the plurality of communication units, the following consists of a method that will allow the telephone resources to be more efficiently allocated to the communication units. The process begins when a communication unit of a first communication group transmits a request for allocation of a telephone resource. Upon receiving the request, the resource allocator determines what communication group the requesting communication unit is from. Subsequently, the communication resource allocator determines whether the requesting communication unit has primary access to at least one telephone resource in either the first or second limited number of telephone resources based upon its affiliated communication group. When a telephone resource is available and the requesting communication unit has primary access to that telephone resource, the resource allocator allocates the available telephone resource to the requesting communication unit based upon a preestablished allocation procedure.

DESCRIPTION OF A PREFERRED EMBODIMENT

Figure 1:
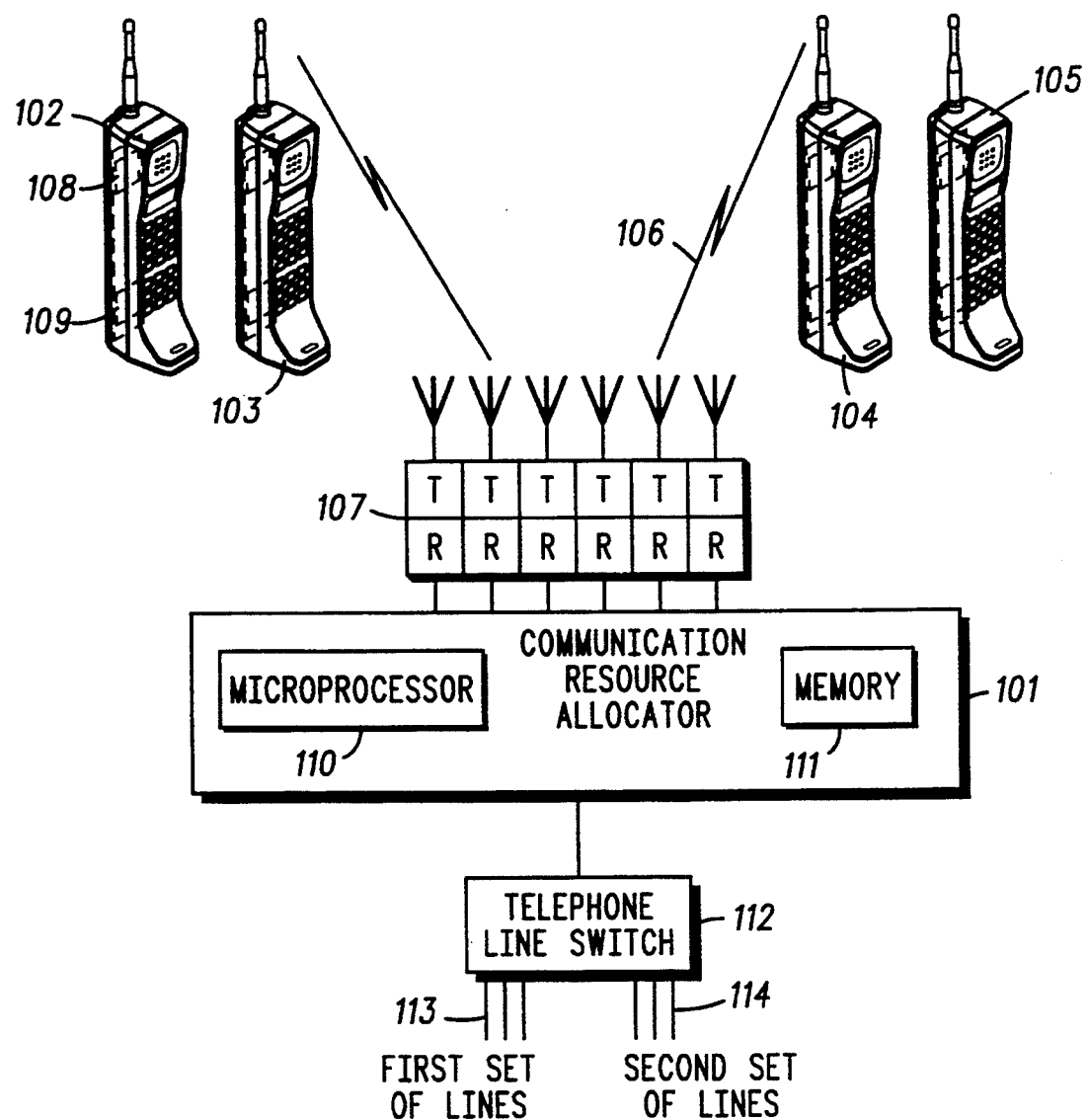
FIG. 1 illustrates a communication system that may incorporate the present invention.

FIG. 1 illustrates a trunking communication system that comprises a communication resource allocator 101, a plurality of communication units (four shown) 102–105, a limited number of communication resources 106, a limited number of repeaters 107, a telephone line switch 112, and several sets of telephone lines (two shown) 113, 114. Each of the communication units 102–105, comprises at least one microprocessor 108 and a digital storage memory device 109 which may be RAM, ROM, or any other type of means for storing digital information. The communication resource allocator 101 comprises at least one microprocessor 110 and digital memory 111, wherein the digital memory may be RAM, ROM, or any other type of means for storing digital information. Each of the communication resources 106 is transceived between the communication units 102–105 and the communication resource allocator 101 via the repeaters 107, wherein the repeaters may comprise base stations. One of the communication resources 106 is selected as the control channel which transceives trunking communication system control data between the communication resource allocator and the communication units 102–105. The telephone line switch 112, interfaces with the plurality set of lines 113 and 114 enabling the connection for the telephone interconnect call. Each of the set of lines 113 and 114 have differing characteristics which allow communication units to operate in differing modes. For example, one set of lines 113 may have connections to an internal Public Business Exchange (PBX) and the other set of lines 114 has connections to the Public Switch Telephone Network (PSTN).

The trunking communication system of FIG. 1 supports communications between communication units and telephone lines by allocating communication resources to requesting communication units and allocating telephone resources based upon the communication unit's communication group. The communication unit's communication group is known by the request. The communication group is used to access a communication group to telephone resource database (contained within the memory of the communication resource allocator) to determine which set of phone lines the communication unit is given primary access to. If a primary access line is available, the telephone resource is allocated for this communication unit to complete his call with the pre-established allocation procedure (such as allowing the dialed DTMF digits to be passed to the telephone line). If the resource allocator cannot allocate a primary access line to the communication unit, the resource allocator will determine if there is a secondary access line available. If a secondary access line is available, the resource allocator will allocate the secondary line to the communication unit, and may modify the request from the communication unit to conform to the format of the secondary set of phone lines (this may involve sending out a pre-digit sequence of DTMF digits and then passing to the telephone line, the communication units digits dialed).

Figure 2:
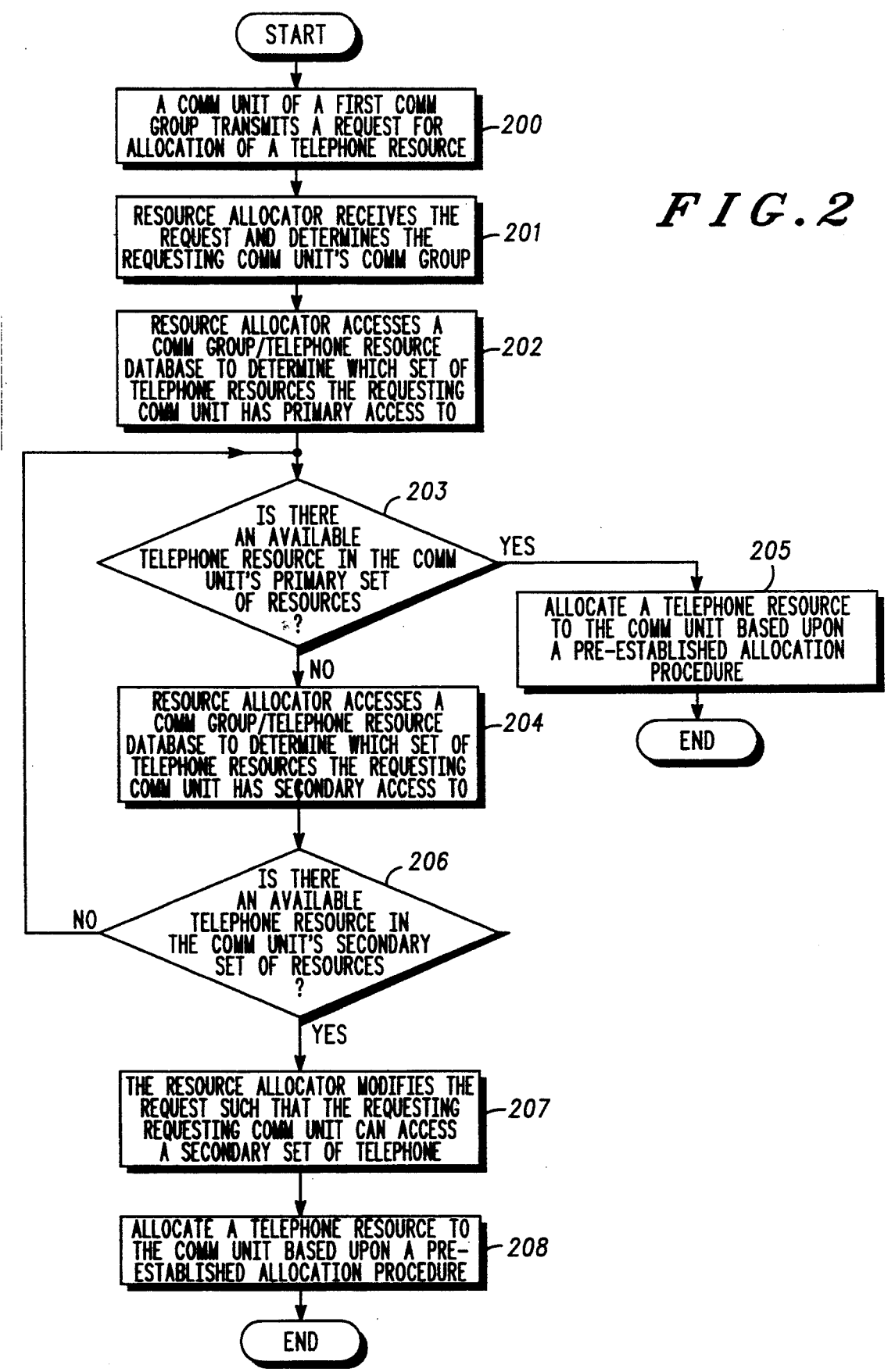
FIG. 2 illustrates a logic diagram that may be used to implement the present invention.

The present invention may be more fully described with reference to the method of FIG. 2 that is employed in a system that has a plurality set of phone lines which have primary access to communication units which are pan of a communication group. The respective portions of the algorithm are programmed into a microprocessor of the communication resource allocator and the communication units. At step 200, a communication unit of a first communication group transmits a request for allocation of a telephone resource to the communication resource allocator. The communication resource allocator processes the request from the communication unit to determine the requesting communication unit's communication group 201. These processes for requesting service from a communication unit and the determining of the communication unit's communication group are known, thus no further discussion will be presented.

The process continues at step 202 where the communication resource allocator accesses a database to determine which set of telephone resources the requesting communication unit's communication group has access to. This database contains information pertaining to which communication groups are allowed to use the system and which set of telephone lines a communication group has primary access to and secondary access to. This database will reside in the communication resource allocators memory 111. After the primary set of phone lines is determined, the communication resource allocator, or resource allocator, determines whether a telephone resource is available in the communication group's primary set of phone lines 203.

If a primary telephone resource is available, the telephone line will be allocated to the requesting communication unit based upon a known pre-established allocation procedure 205. The pre-established allocation procedure may be based on the priority of the communication group the request is from (e.g. a request from the police will more than likely have a higher priority than a request from a florist) or based on the priority of the requesting communication unit (e.g. a request from the police chief will more than likely have a higher priority than a patrol officer). How the resource allocator processes the priority procedure is known in the art, thus no further discussion will be presented.

If, however, a primary telephone resource is not available 203, the communication resource allocator accesses a database to determine which set of telephone resources the requesting communication unit's communication group has secondary access to. As mentioned above, this database, which resides in the communication resource allocators memory 111, contains information regarding which communication groups are allowed to use the system and, for each communication group, information pertaining to which set of phone lines the communication group has secondary access to.

After the secondary set of phone lines is determined, the resource allocator determines whether telephone resource is available in the communication group's secondary set of phone lines 206. If a secondary telephone resource is not available, the process repeats at step 203 such that the resource allocator waits for a telephone resource to become available in either the primary or secondary set of telephone resources. If a secondary telephone resource is available, the resource allocator modifies the request such that the communication unit's request can conform to the format of the secondary set of phone lines (this may involve pre-processing of the dialed phone number by the communication unit to remove some digits and replace them with a specific sequence needed by the phone lines). If them is a telephone resource available in the communication group's secondary set of phone lines, the telephone line will be allocated based upon a pre-established allocation procedure 208 as described above. When the communication ends, the telephone resource is reclaimed by the resource allocator and the communication unit's requesting capabilities are reset to requesting primary telephone resources.

The above described process allows the resource allocator to more efficiently respond to telephone requests in a communication system that has several different types of telephone resources. In addition, the above procedure may be performed for several telephone resource requests simultaneously within the same communication group or among different communication groups.

We claim:

1. In a communication system that includes a plurality of communication units that are arranged into communication groups, a limited number of communication resources that are transceived via repeaters, a first limited number of telephone resources, at least a second limited number of telephone resources and a resource allocator that allocates the communication resources and the telephone resources among the plurality of communication units, a method for allocating the telephone resources among the plurality of communication units, the method comprises the steps of:

a) transmitting, by a communication unit of a first communication group, a request for allocation of a telephone resource to the resource allocator, wherein the request for allocation includes a group identity of the requesting communication unit and conforms to a format utilized by a telephone resource that the first communication group has primary access to;

b) determining, by the resource allocator, that the requesting communication unit is from the first communication group;

c) determining, by the resource allocator and based the on the first communication group, whether the requesting communication unit has primary access to at least one telephone resource in either the first or second limited number of telephone resources: and d) when a telephone resource is available and the requesting communication unit has primary access to the telephone resource, allocating, by the resource allocator, the telephone resource to the requesting communication unit based upon a pre-established allocation procedure, the method further comprising when a telephone resource is available and the requesting communication unit does not have primary access to the available telephone resource, modifying, by the resource allocator, the request for allocation of the telephone resource to request access to a telephone resource that the requesting communication unit does not have primary access to.

* * * * *